United States Patent [19]

Paulin et al.

[11] 4,050,830

[45] Sept. 27, 1977

[54] DOUBLE-SIGMOID CONNECTOR

[75] Inventors: Robert Charles Paulin, Clarksville, Ind.; Ronald Joseph Billings, Fern Creek, Ky.

[73] Assignee: Chemetron Corporation, Chicago, Ill.

[21] Appl. No.: 679,335

[22] Filed: Apr. 22, 1976

[51] Int. Cl.² .............................................. F16B 1/00
[52] U.S. Cl. .................................. 403/205; 285/131; 285/286; 403/271
[58] Field of Search ............... 403/205, 174, 178, 271, 403/272, 346, 406; 285/131, 132, 150, 179, 188, 286; 228/153, 6

[56] References Cited

U.S. PATENT DOCUMENTS

| 706,534 | 8/1902 | Dawson | 403/178 |
|---|---|---|---|
| 1,382,607 | 6/1921 | Rathbone et al. | 403/272 |
| 3,445,129 | 5/1969 | Penote | 403/174 |

FOREIGN PATENT DOCUMENTS

| 925,325 | 3/1955 | Germany | 285/150 |
|---|---|---|---|
| 519,027 | 3/1940 | United Kingdom | 285/286 |

Primary Examiner—Wayne L. Shedd
Attorney, Agent, or Firm—N. M. Esser

[57] ABSTRACT

A double-sigmoid connector is used to interconnect structural members in a trusswork and comprises a pair of arcuate elbows joined to each other at their outer peripheral midsections. Coaxial outlets are formed in the elbows at their inner peripheral midsections.

6 Claims, 1 Drawing Figure

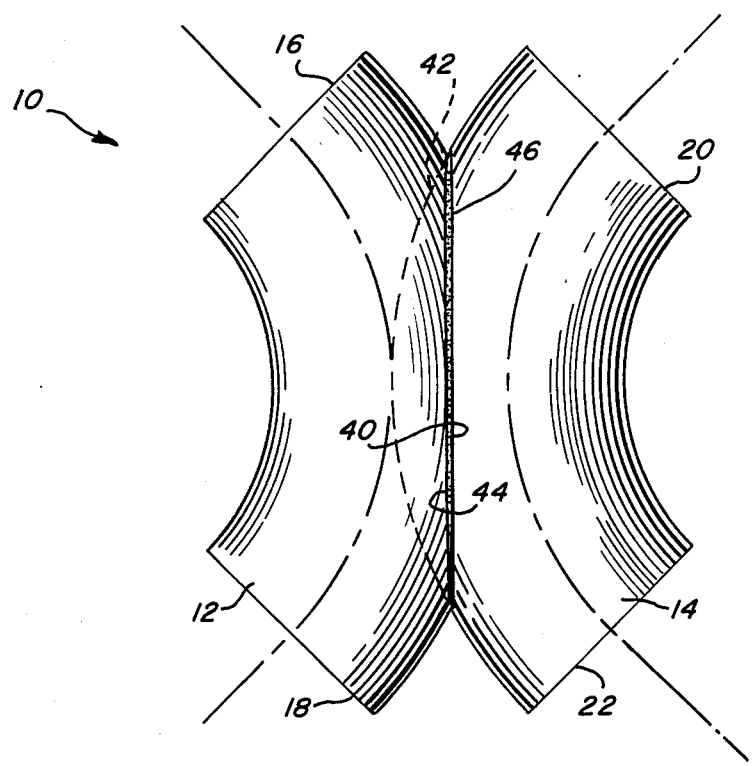

DOUBLE-SIGMOID CONNECTOR

BACKGROUND OF THE INVENTION

This invention pertains to a double-sigmoid connector, which has particular utility to interconnect structural members in a trusswork, as in an offshore drilling platform. The connector of this invention may be made and used as a pressure-tight fitting.

In a trusswork made of structural piping of circular cross-section, serious difficulties have been encountered when various pipes must be welded together to form a four-way interconnection, in which respective ends of four pipes must be welded together. In an offshore drilling platform, as a very significant example, many interconnections respectively comprising four angularly extending pipes of 48-inch outer diameter may be encountered.

In prior practices, the ends of the pipes often were cut into complex curvatures so as to permit the ends of the pipes to be welded together with complex failure-prone weldments to form each multi-way interconnection as noted above. These practices have been costly and difficult and have left a need for improved connectors enabling such multi-way interconnections of structural members in a trusswork to be made, less expensively and more easily, with simpler more reliable weldments.

SUMMARY OF THE INVENTION

This invention is addressed to the above-mentioned need for improved connectors enabling such multi-way interconnections of structural members in a trusswork to be made, less expensively and more easily, with similar more reliable weldments. These objects have been attained in a connector described herein as a double-sigmoid connector and designed to be made from arcuate elbows joined together in a pair, as noted below, to provide, at their ends, four possible tubular connections for as many structural pipes.

Heavy-walled metal elbows may be used to provide a reliable, rugged, integral connector, which may be easily tested and inspected before its use. A simple circumferential weldment, which may be easily applied, tested, and inspected, suffices to connect each pipe to the connector.

The foregoing and other objects, features, and advantages of this invention are evident from a more detailed description below of an embodiment of this invention, with particular reference to an accompanying drawing.

BRIEF DESCRIPTION OF THE DRAWING

The drawing contains one FIGURE, namely, an elevational view of a double-sigmoid connector constituting an embodiment of this invention.

DETAILED DESCRIPTION OF AN EMBODIMENT

In the drawing, a double-sigmoid connector 10 is shown to comprise a pair of arcuate elbows 12 and 14 respectively. Except as noted below, each elbow is identical. Typically, each elbow may be made of forged steel with 48-inch outer diameter and 1.25-inch wall thickness. Each elbow is shown to have a 90° included angle between its ends. Conventional elbows in these sizes have been commercially available from Chemetron Corporation, Tube Turns Division, Louisville, Ky. 40201, for many years.

In the connector 10, the elbows 12 and 14 have coplanar centerlines, and each elbow has opposite ends normal to its centerlines. The connector 10 is symmetrical about an axis through the midpoints of these centerlines.

Opposite ends 16 and 18 of the elbow 12 and opposite ends 20 and 22 of the elbow 14 are adapted to be connected respectively by circumferential weldments (not shown) to structural pipes (not shown) of suitable diameter and wall thickness. The ends 16 and 18 and the ends 20 and 22 may be beveled in conventional manner as desired to accomodate such weldments.

A sector (not shown) of the elbow 12 is removed so as to leave an elongated opening 40 in the elbow 12. A sector 42 (phantom lines) of the elbow 14 may similarly be removed so as to leave an elongated opening 44 in the elbow 14. The elbows 12 and 14 are joined together by a continuous circumferential weldment 46 around the margins of the opening 40.

The elbows 12 and 14 are so joined that the end 16 of the elbow 12 and the end 22 of the elbow 14 define parallel non-coincident axes and that the end 20 of the elbow 14 and the end 18 of the elbow 12 define parallel non-coincident axes. Due allowance for such geometry must be made in any design of a trusswork employing such connectors.

The respective included angles between opposite ends of the elbows 12 and 14 and the size of the opening 40 and consequent penetration of the opening 40 by the above-mentioned portion 42 of the elbow 14 may be varied with countless permutations so as to accommodate structural pipes oriented at various angles to one another. Exact symmetry about the above-mentioned axis through the midpoints of the centerlines of the elbows 12 and 14 also may be forsaken, wherefore the elbows 12 and 14 may be oriented such that the respective included angle between the end 18 of the elbow 12 and such axis and the end 22 of the elbow 12 and such axis may exceed the respective included angles between the end 16 of the elbow 12 and such axis and the end 20 of the elbow 14 and such axis, for more permutations as may be useful in geodesic domes and similar structures.

With sound weldments, as and where described above, the connector 10 may be used as a pressure-containing vessel. Although the connector 10 has been described above with exemplary dimensions suitable for an offshore drilling platform and other large-scale structures, such connectors can also be made to smaller scales for smaller structures.

We claim:

1. A double sigmoid structural connector comprising: a pair of arcuate pipe elbows having coplanar, arcuate centerlines, one of said pair having an elongated opening in its outer periphery and the other of said pair having a portion of its outer periphery extending into said opening and substantially closing same, said one elbow being rigidly joined to said other elbow around said opening.

2. The connector of claim 1 in which each elbow has opposite ends normal to its centerline.

3. The connector of claim 2 wherein each elbow has a right included angle between its ends.

4. The connector of claim 1 in which said connector is symmetric about an axis through said centerlines at their midpoints.

5. The connector of claim 4 in which each elbow has opposite ends normal to its centerline.

6. The connector of claim 5 wherein each elbow has a right included angle between its ends.

* * * * *